(12) United States Patent
Harper et al.

(10) Patent No.: US 7,106,462 B2
(45) Date of Patent: Sep. 12, 2006

(54) SYSTEMS AND METHODS FOR ANALYZING A PRINT JOB

(75) Inventors: Mark A. Harper, Middleton, ID (US); Quintin T. Phillips, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 873 days.

(21) Appl. No.: 09/824,902

(22) Filed: Apr. 2, 2001

(65) Prior Publication Data
US 2002/0141764 A1 Oct. 3, 2002

(51) Int. Cl.
*G06F 15/00* (2006.01)

(52) U.S. Cl. .................... 358/1.14; 358/1.12

(58) Field of Classification Search ........... 358/1.15, 358/1.12, 1.13, 1.14, 1.1, 296, 538, 453; 399/24, 9, 27, 25, 56, 58, 60, 61, 62; 347/19, 347/7
See application file for complete search history.

(56) References Cited

U.S. PATENT DOCUMENTS

| | | | | |
|---|---|---|---|---|
| 5,337,362 A | * | 8/1994 | Gormish et al. ............ 380/54 |
| 5,459,556 A | | 10/1995 | Acquaviva | |
| 5,592,298 A | * | 1/1997 | Caruso ...................... 358/504 |
| 5,663,750 A | * | 9/1997 | Sakuma ........................ 347/7 |
| 5,937,225 A | | 8/1999 | Samuels ...................... 399/27 |
| 5,987,221 A | * | 11/1999 | Bearss et al. ................ 358/1.9 |
| 5,987,226 A | * | 11/1999 | Ishikawa et al. .......... 358/1.13 |
| 6,006,013 A | * | 12/1999 | Rumph et al. ............ 358/1.15 |
| 6,027,200 A | * | 2/2000 | Takahashi et al. ............ 347/19 |
| 6,028,674 A | * | 2/2000 | Tognazzini ............... 358/1.13 |
| 6,175,698 B1 | * | 1/2001 | Scheuer et al. .............. 399/58 |
| 6,317,217 B1 | * | 11/2001 | Toda ........................ 358/1.11 |
| 6,356,359 B1 | * | 3/2002 | Motamed .................... 358/1.8 |
| 6,366,744 B1 | * | 4/2002 | Phillips et al. ............... 399/24 |
| 6,456,387 B1 | * | 9/2002 | Pardo et al. ............... 358/1.13 |
| 6,466,749 B1 | * | 10/2002 | O'Brien ...................... 399/27 |
| 6,517,175 B1 | * | 2/2003 | Kanaya et al. ................ 347/7 |
| 6,809,833 B1 | * | 10/2004 | Blair et al. ............... 358/1.16 |
| 6,903,837 B1 | * | 6/2005 | Moreau et al. ............ 358/1.15 |
| 2002/0060801 A1 | * | 5/2002 | Motamed et al. .......... 358/1.13 |

FOREIGN PATENT DOCUMENTS

| | | |
|---|---|---|
| DE | 69321045 | 2/1999 |
| DE | 68929197 | 12/2000 |
| EP | 0996041 A2 | 4/2000 |

* cited by examiner

*Primary Examiner*—Gabriel I. Garcia

(57) ABSTRACT

The present invention includes as one embodiment a method for ascertaining resource requirements of a print job sent to a printer via a print driver. The method includes creating a document of the print job with the print driver and reading the print job into memory directly from the print driver, sampling a task requiring a consumable resource to provide a sample by overlaying a sample window over a portion of the document and providing low resolution level analysis data with respect to resource requirements of the task, analyzing the sample window and low resolution level analysis of the task with respect to resource requirements thereof and providing task sample requirement data in response thereto and ascertaining the resource requirements of the task based on the task sample requirement data.

40 Claims, 4 Drawing Sheets

SYSTEMS AND METHODS FOR ANALYZING A PRINT JOB

BACKGROUND OF THE INVENTION

1. Field of Invention

This invention relates to printers, plotters and other such devices. Specifically, the present invention relates to systems and methods for analyzing print job requirements and estimating printer or plotter resource availability for same.

2. Description of the Related Art

Job length assurance is a feature being designed into state of the art printers, plotters and other devices employing consumable resources. Job length assurance involves: 1) monitoring of printer resources (e.g. toner); 2) analyzing print jobs to estimate the resource requirements for same; and 3) either printing the job or providing an indication of insufficient resources.

Numerous methods are known in the art for determining the amount of resources required for a given print job. See for example, U.S. Pat. No. 5,937,225, issued Aug. 10, 1999 to D. J. Samuels and entitled PIXEL COUNTING TONER OR INK USE MONITOR AND PIXEL COUNTING METHOD FOR MONITORING THE TONER OR INK USE and the references cited therein, the teachings of which are incorporated herein by reference. These references illustrate that conventional techniques for analyzing the print job to estimate resource, particularly toner, requirements require a number of calculations by the printer driver on the computer and/or the printer. For each job, the driver must typically rasterize each of a number of jobs that may be in the queue.

As the number and intensity of the calculations may unduly burden the computer and the printer and delay print and other operations, a need remains in the art for a system or method for analyzing print job requirements more quickly and easily for job length assurance applications.

SUMMARY OF THE INVENTION

The need in the art is addressed by the systems and methods for ascertaining resource requirements of the present invention. One embodiment of the invention provides a method for ascertaining resource requirements including the steps of: sampling a task requiring a consumable resource to provide a sample; analyzing the sample of the task with respect to resource requirements thereof and providing task sample requirement data in response thereto; and ascertaining the resource requirements of the task based on the task sample requirement data.

In a specific implementation of the invention, the method further includes the steps of reading a file containing the document into a buffer; formatting the file in the buffer in print format; overlaying a sample window over the print formatted file in the buffer, the window having an area of 1/x times the area of the document, and performing a Raster Image Processing analysis within the sample window to determine window coverage. The step of ascertaining the resource requirements of the task further includes the step of multiplying the window coverage by x to determine the page coverage of the document. The page coverage is then multiplied by the number of pages in the task to determine job requirements. Job requirements are then compared to available resources and the job is executed if sufficient resources are available. Otherwise, a message is displayed or resources are automatically provided if such capability is enabled.

In a second embodiment, the inventive method includes the steps of: sampling a task requiring a consumable resource to provide low resolution level analysis data with respect to resource requirements of the task and comparing the low level analysis data to data relating to an availability of the resource and providing an output in response thereto. In a more specific implementation of the second embodiment, actual data is used to improve the accuracy of the low level analysis.

The two embodiments may be used in combination for further improvements in speed and further reductions in computational intensity.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
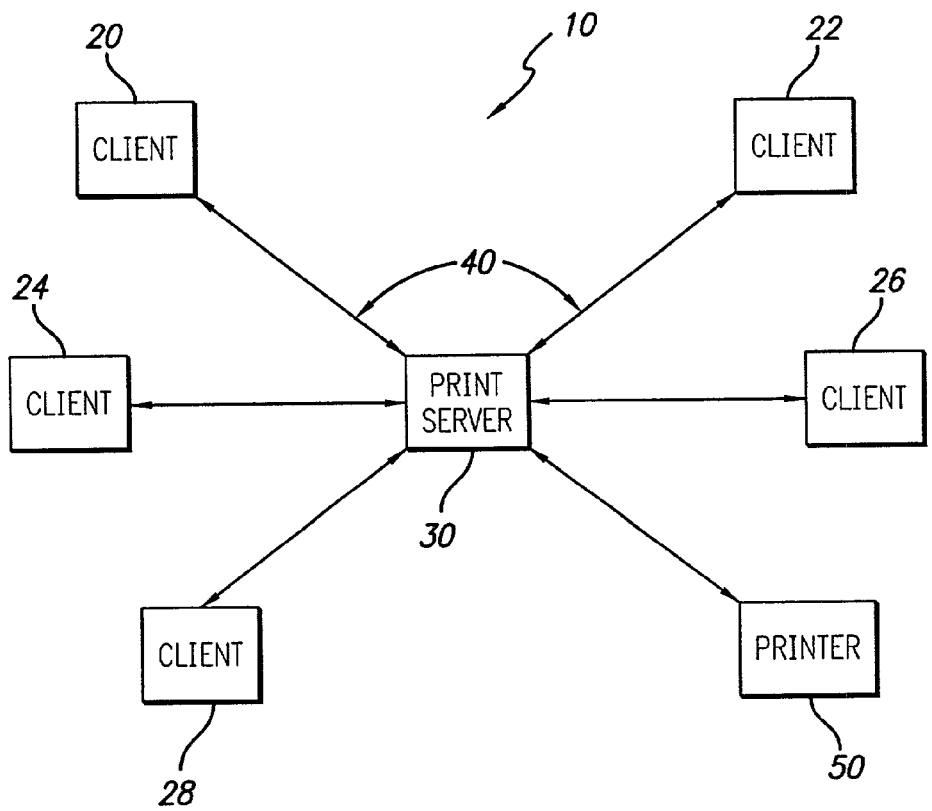
FIG. 1 is a block diagram showing a network topology consistent with the teachings of the present invention.

FIG. 1 is a block diagram showing a network topology consistent with the teachings of the present invention. As shown in FIG. 1, the system 10 includes a number of client machines (of which five are shown for illustration) 20, 22, 24, 26 and 28 which are connected to a print server 30 via a network 40. A printer 50 is shown as is typical in a local area network (LAN) configuration. However, a printer may be driven by any of the client machines directly. Further, those skilled in the art will appreciate that the teachings of the present invention are not limited to LAN implementation. The present teachings may be utilized in an Internet, Intranet, wide area network (WAN), wireless or other network topology.

Figure 2:
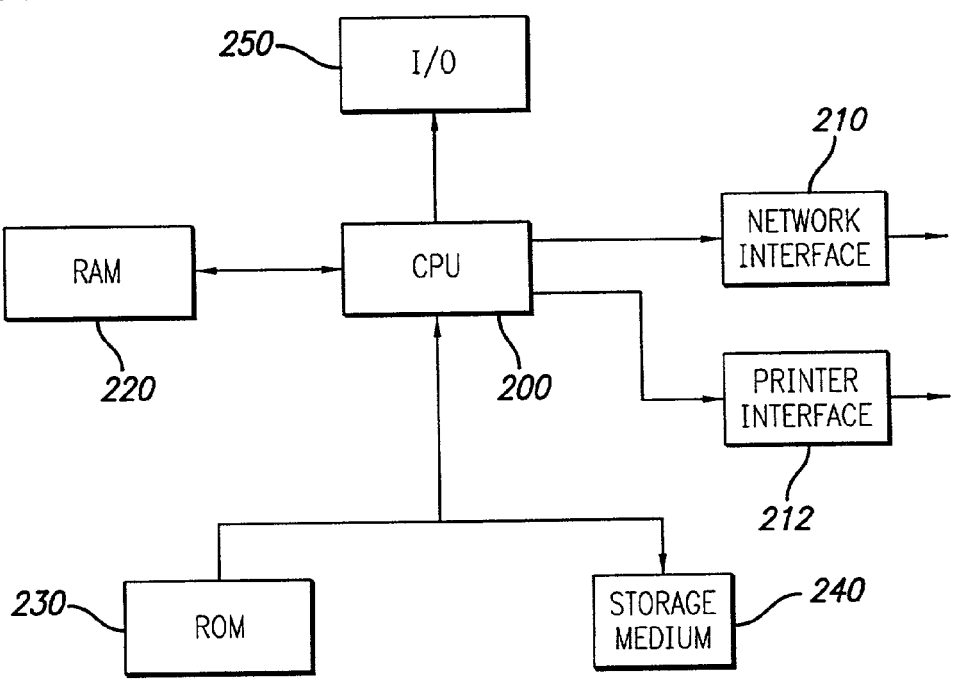
FIG. 2 is a block diagram of an illustrative implementation of a client computing system adapted for use in accordance with the teachings of the present invention.

FIG. 2 is a block diagram of an illustrative implementation of a client computing system adapted for use in accordance with the teachings of the present invention. The client system 20 includes a central processing unit 200 which communicates with the network 40 via a network interface 210. Also included is a conventional printer interface 212. The CPU 200 executes software stored in a random-access memory 220, a read-only memory 230 and a storage medium 240 and communicates with a user via an input/output interface 250 in a manner well-known to those skilled in the art.

As discussed more fully below, the client system 20 executes a variety of software applications such as word processing programs, spreadsheets, etc. (referred to herein as the "native" application) as is currently common practice. When a user, working in an application, desires to print a document, a print command is executed which issues a 'print job' to the printer 50.

Figure 3:
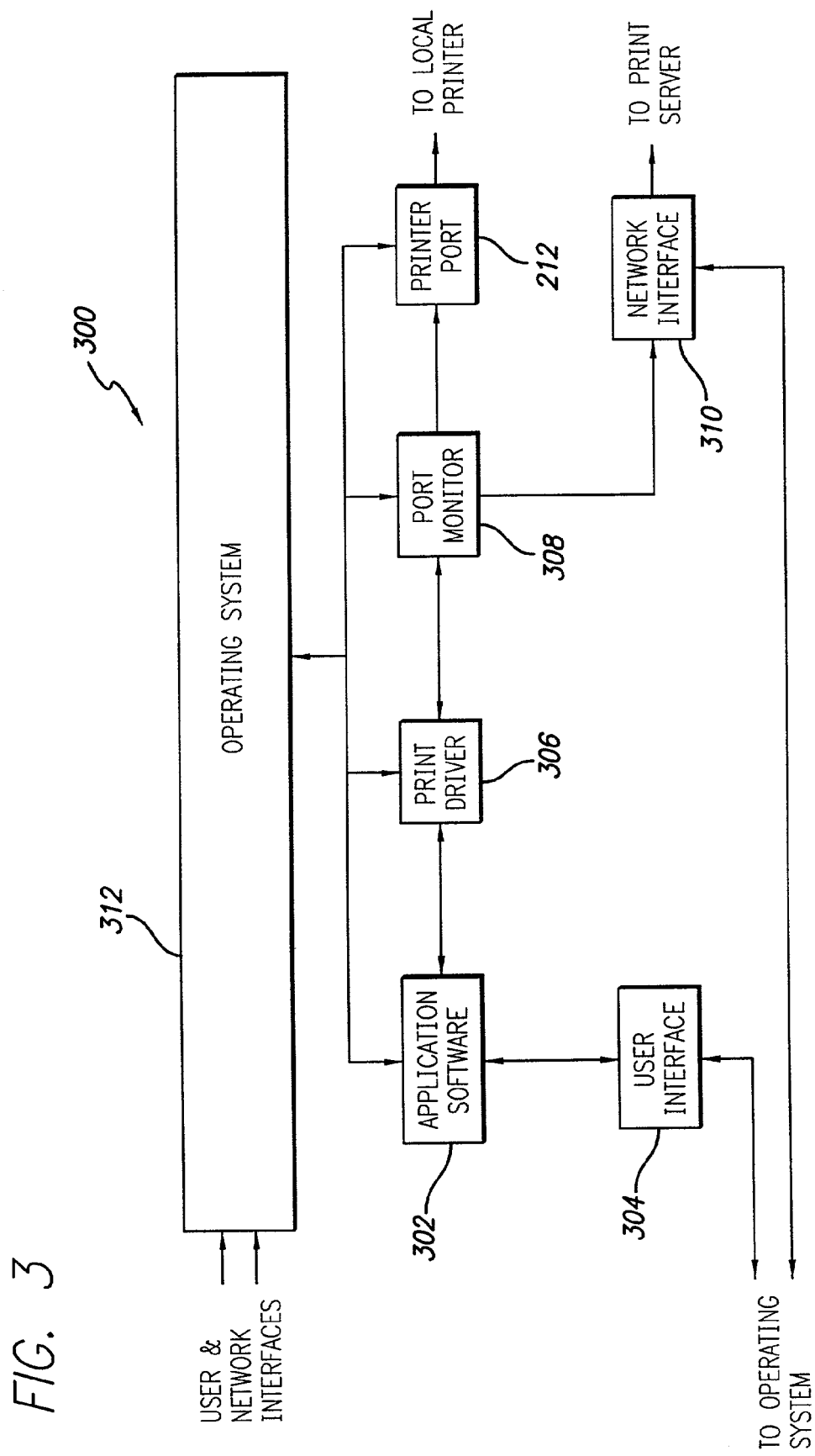
FIG. 3 is a diagram showing the architecture of the client system software in accordance with the present teachings.

FIG. 3 is a diagram showing the architecture of the client system software in accordance with the present teachings. The client side software architecture 300 includes a native application 302 which communicates with a user interface 304 and print driver 306. In response to user inputs, in a normal local print mode, the print job is passed to the printer (not shown) via the print driver 306, and a port monitor 308 monitors the printer port 212 which is under control of the operating system 312. In a network printing scenario, the print job is passed to the network printer (50) via the print driver 306 and network interface 310 under control of a network operating system running on the print server 30.

On receipt of the print job, the driver 306 performs a job length assurance analysis. As mentioned above, job length assurance is a feature being designed into state of the art printers, plotters and other devices employing consumable resources. Job length assurance involves: 1) monitoring of printer resources (e.g. toner); 2) analyzing print jobs to estimate the resource requirements for same; and 3) either printing the job or providing an indication of insufficient resources.

Numerous methods are known in the art for determining the amount of resources required for a given print job. See for example, the above-cited U.S. Pat. No. 5,937,225, issued Aug. 10, 1999 to D. J. Samuels and entitled PIXEL COUNTING TONER OR INK USE MONITOR AND PIXEL COUNTING METHOD FOR MONITORING THE TONER OR INK USE and the references cited therein, the teachings of which have been incorporated herein by reference. These references illustrate that conventional techniques for analyzing the print job to estimate resource, particularly toner, requirements require a large number of calculations by the printer driver on the computer and/or the printer. For each job, the driver must typically rasterize each of a number of jobs that may be in the queue. Rasterizing the job involves analyzing each document to compute a ratio of laser on and laser off times. This ratio provides an indication of the amount of toner and other resources to be consumed by the job. This calculation is time intensive and is conventionally performed for each document. As the number and intensity of the calculations may unduly burden the computer and the printer and delay print and other operations, a need exists in the art for a system or method for analyzing print job requirements more quickly and easily for job length assurance applications.

The present invention addresses this need. There are two significant features of the invention. A first feature results from a provision of a system for segmenting the document to provide a sample window. A RIP (Raster Image Processing) analysis is performed with respect to the sample to determine a ratio of laser on and laser off times for same. On the basis of the RIP analysis with respect to the sample data, the requirements of the entire document are estimated. The resource requirements of the entire job are then estimated, page by page, in a similar manner and compared to a resource (e.g. toner) availability data provided by the printer. If adequate resources are available, the job is printed. If adequate resources are not available, a message is provided to the user or, if the printer is automatically supplied with additional resources. This is illustrated in FIG. 4.

Figure 4:
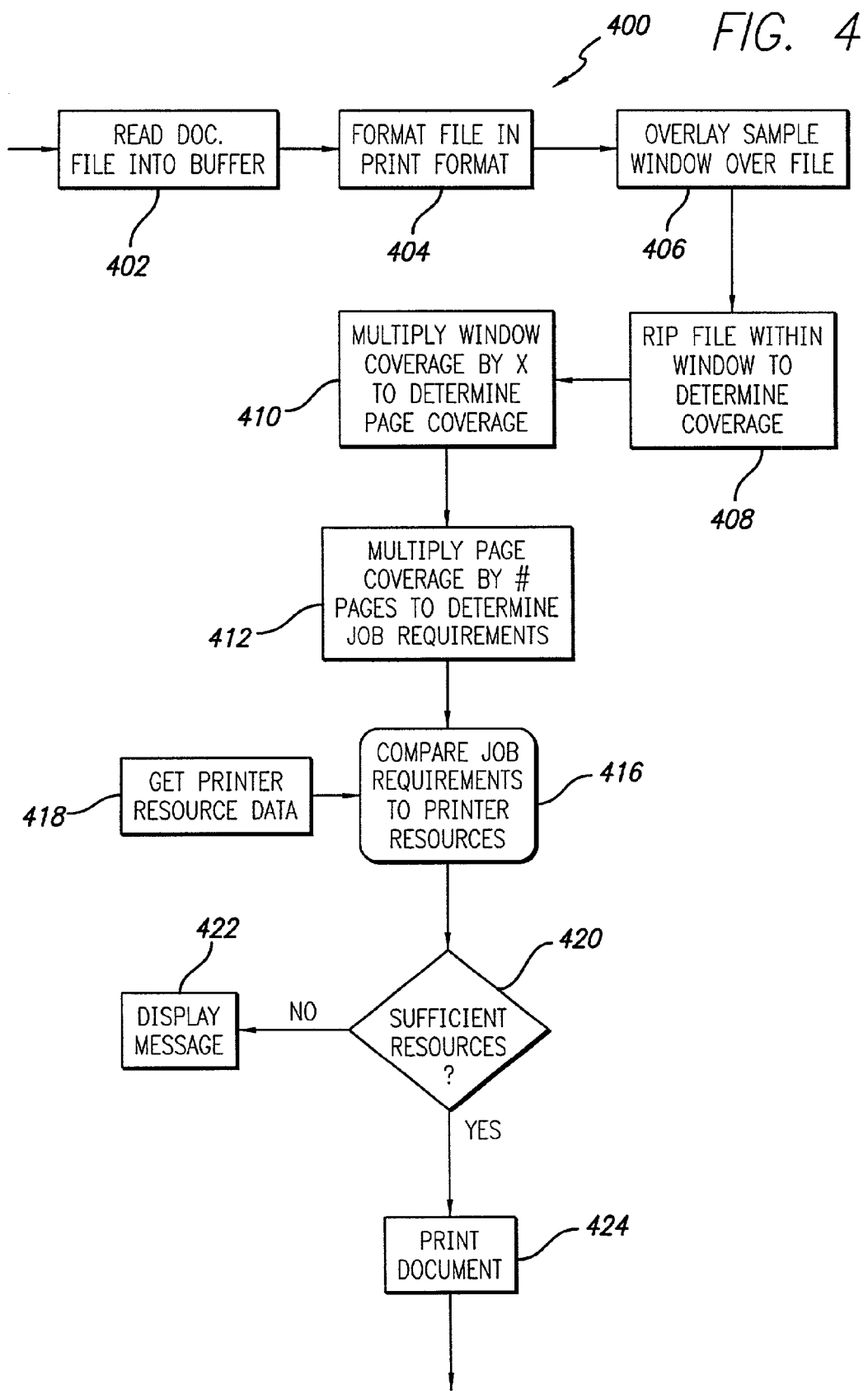
FIG. 4 is a flow diagram illustrating the segmenting method of sampling a print job to ascertain the consumable resource requirements thereof in accordance with the teachings of the present invention.

FIG. 4 is a flow diagram illustrating the segmenting method of sampling a print job to ascertain the consumable resource requirements thereof in accordance with the teachings of the present invention. In accordance with the inventive method 400, at step 402, each document in the print job is read into a buffer. At step 404, the document is organized in the buffer in a print format. This format is consistent with the layout of the document on the print media. Next, a sample window is overlayed over the document in memory (step 406). In practice, this would involve reading data in the buffer associated with the document from predetermined row and column memory locations so as to create an area of known size, less than the total anticipated size of the printed document. That is, if the document has an area A, the window might have a size of ¼ A.

Within the window, the laser on and off times are computed in accordance with the conventional RIP analysis at the desired resolution of the print document (step 408). The on/off times computed within the window are multiplied by a scale factor x to determine the page coverage (step 410). In the present example, x is '4'. At step 412, the page coverage is multiplied by the number of pages to determine the job requirements. As an alternative, steps 402–410 could be repeated for each page in the job to ascertain the job requirements.

In any event, in steps 416–424, the job requirements are compared to the printer resources (steps 416, 418, and 420) and if sufficient resources are not available, a message is displayed (step 422) advising the user that toner or paper are low. If sufficient resources are available, then at step 424, the document is printed.

A second feature of the invention resides in a provision of a system for performing a RIP analysis of the entire document (or job) at a first low level of resolution (e.g. 50 dots per inch) and comparing the result to printer resource data. If adequate resources are available, the job is printed. (Those skilled in the art will appreciate that the invention is not limited to a 50 dpi implementation. Other "low" resolution levels may be used without departing from the scope of the present teachings.) Actual resource consumption data is then used to improve on future estimates. If adequate resources are not available, a message is provided to the user or, the printer is automatically supplied with additional resources is an automated replenishment system is provided. This is depicted in FIG. 5.

Figure 5:
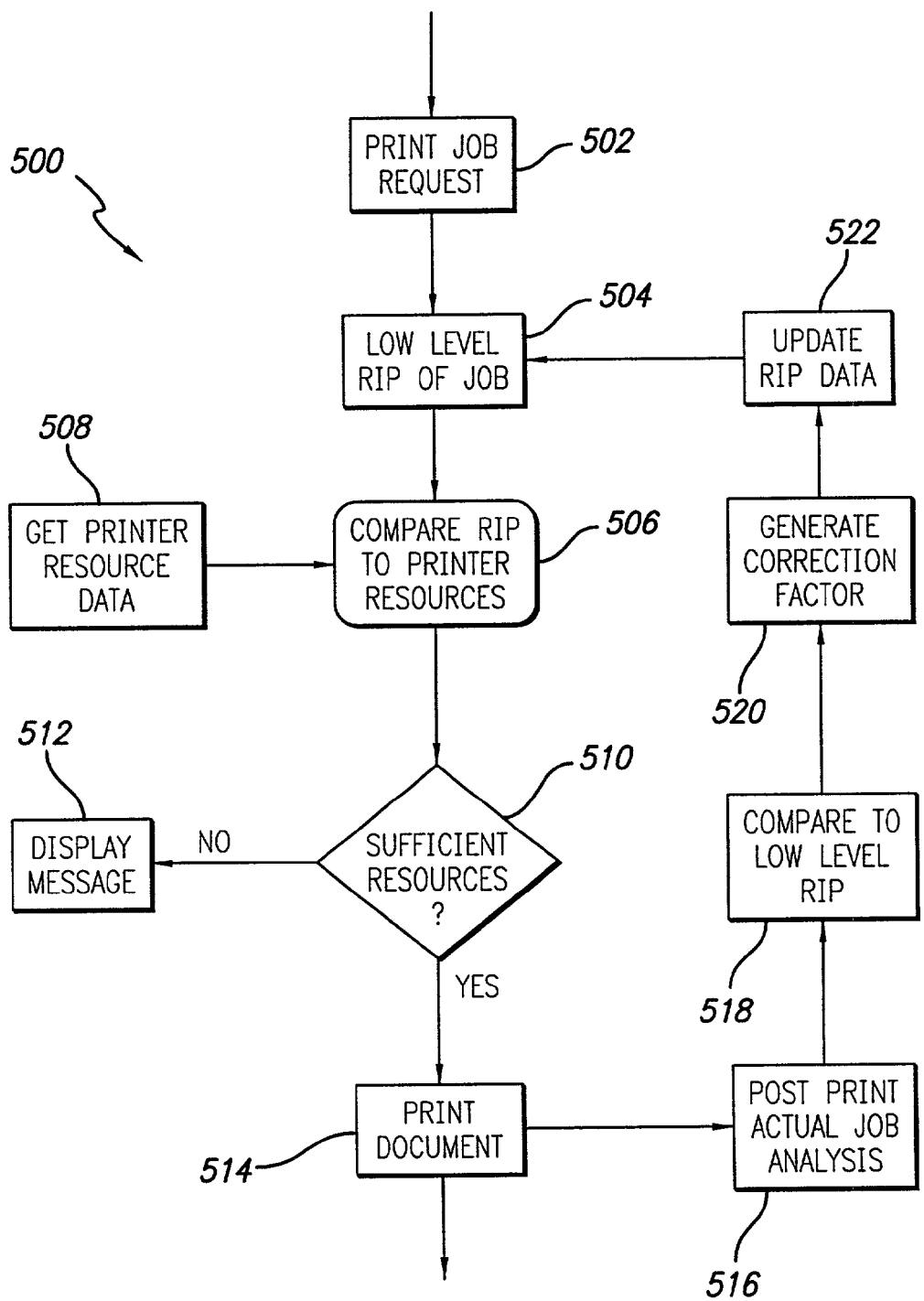
FIG. 5 is a flow diagram illustrating the low resolution method of sampling a print job to ascertain the consumable resource requirements thereof in accordance with the teachings of the present invention.

FIG. 5 is a flow diagram illustrating the low resolution method of sampling a print job to ascertain the consumable resource requirements thereof in accordance with the teachings of the present invention. In accordance with the inventive method 500, first a print job is initiated 502, next, at step 504 each document in the print job is read into a buffer and organized in a print layout format as per steps 402 and 404 as per the method 400 depicted in FIG. 4. At step 504, a RIP analysis is performed on each document in the job at a first low level of resolution, e.g. 50 dots per inch (dpi). If any portion of a low level pixel analyzed to contain print "turns on" the entire pixel. As an alternative, in accordance with the teachings provided in the flow chart 400 above, the low level RIP analysis may be performed within a window on each document. The low level requirements for each document may be extrapolated in the manner provided above.

In any event, the process is repeated for each document in the job to ascertain the job requirements. Then at steps 506–514, the job requirements are compared to the printer resources (steps 506, 508 and 510) and if sufficient resources are not available, a message is displayed (step 512) advising the user that toner or paper are low. If sufficient resources are available, then at step 514, the document is printed.

At step 516, the actual resources required to print the job are computed. This data may be supplied on command by the printer which would simply subtract the toner supply after printing the job from the supply before printing the job. At step 518, the actual requirements are compared to the requirements predicted by the low level RIP analysis and, at step 520, a correction factor or error value is computed. This correction factor is used at step 522 to update the RIP data to more accurately estimate future jobs.

Those skilled in the art will appreciate that the systems and methods disclosed herein provide a method for performing a job length analysis that is less computationally intensive and substantially faster than the conventional technique.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method for ascertaining resource requirements of a print job via a printer driver, the method including:
   creating a document of the print job with the print driver and reading the print job into memory directly from the print driver;
   formatting the document in the memory into a print format consistent with a layout of the document on print media, the formatted document having a document area;
   overlaying a sample window over a single portion of the formatted document in the memory, the window having a window area smaller than the document area;
   analyzing the single portion to determine consumable resource requirements of the portion; and
   ascertaining the resource requirements of the print job based on the resource requirements of the single portion prior to sending the print job to a printer.

2. The invention of claim 1 wherein the document includes an image.

3. The invention of claim 1 wherein the memory is a computer readable buffer.

4. The invention of claim 1 wherein the step of analyzing includes performing a Raster Image Processing analysis on the single portion of the formatted document within the sample window to determine window coverage.

5. The invention of claim 4 wherein the document area is defined by a first plurality of dots in a row dimension and a second plurality of dots in a column dimension, wherein the window area is defined by a third plurality of dots in the row dimension and a fourth plurality of dots in the column dimension, the third plurality less than the first plurality, and the fourth plurality less than the second plurality, and wherein the step of ascertaining the resource requirements includes multiplying the window coverage by a factor related to a size of the window area to determine the page coverage of the document.

6. The invention of claim 5 wherein the step of ascertaining the resource requirements includes multiplying the page coverage by a number of pages in the print job to determine job requirements.

7. The invention of claim 6 including the step of comparing the resource requirements of the task to data relating to an availability of the resources.

8. The invention of claim 7 further including the step of executing the task if sufficient resources are available.

9. The invention of claim 8 further including the step of providing message if sufficient resources are not available.

10. The invention of claim 9 further including the step of securing additional resources if sufficient resources are not available.

11. The method of claim 1, wherein the formatting includes formatting the document at a print resolution, and wherein the analyzing is performed at the print resolution.

12. The method of claim 1, wherein the formatting includes formatting the document at a print resolution, and wherein the analyzing is performed at a different resolution lower than the print resolution.

13. The method of claim 1, comprising:
   sending the print job to the printer after the ascertaining.

14. The method of claim 1, wherein the document area is defined by a first plurality of dots in a row dimension and a second plurality of dots in a column dimension, and wherein the window area is defined by a third plurality of dots in the row dimension and a fourth plurality of dots in the column dimension, the third plurality less than the first plurality, and the fourth plurality less than the second plurality.

15. The invention of claim 14, wherein the step of ascertaining the resource requirements includes multiplying the window coverage by a factor related to a size of the window area to determine the page coverage of the document.

16. A method for ascertaining resource requirements of a print job via a print driver, the method including:
   creating a document of the print job with the print driver and reading the print job into memory directly from the print driver;
   overlaying a sample window over a single portion of the document;
   performing a low resolution level analysis of only the single portion of the formatted document overlaied by the sample window to determine consumable resource requirements of the overlaied portion;
   extrapolating the resource requirements of the single overlaied portion to estimate consumable resource requirements of the entire print job; and
   comparing the estimated resource requirements of the print job to data relating to an availability of the resource and providing an output with response thereto prior to sending the print job to a printer.

17. The invention of claim 16 wherein the low resolution level analysis is performed at fifty dots per square inch.

18. The invention of claim 16 further including the step of providing actual resource requirements of the print job.

19. The invention of claim 18 further including the step of comparing the actual resource requirements to the estimated resource requirements and generating correction data in response thereto.

20. The invention of claim 19 further including the step of adjusting the low resolution level analysis in response to the correction data.

21. The invention of claim 20 wherein the print job includes printing an image on a document.

22. The invention of claim 21 wherein the print job includes printing plural images on plural documents.

23. The invention of claim 22 wherein the images include text.

24. The invention of claim 16 wherein the performing a low resolution level analysis includes performing a Raster Image Processing analysis on the single portion of the formatted document overlaid by the sample window.

25. The invention of claim 16 including printing the print job if sufficient resources are available.

26. The invention of claim 16 further including the step of providing a message if sufficient resources are not available.

27. The invention of claim 16 further including the step of securing additional resources if sufficient resources are not available.

28. A program stored on a computer readable medium for ascertaining resource requirements of a print job received by a print driver including:
 code for creating a document of the print job with the print driver and reading the print job into memory directly from the print driver;
 code for formatting the document in the memory into a print format consistent with a layout of the document on print media, the formatted document having a document area;
 code for overlaying a sample window over a single portion of the formatted document in the memory, the window having a window area smaller than the document area;
 code for analyzing the single portion to determine consumable resource requirements of the portion; and
 code for ascertaining the resource requirements of the print job based on the resource requirements of the single portion prior to sending the print lob to a printer.

29. The invention of claim 28 wherein the document includes an image.

30. The invention of claim 28 including code for reading a file containing the document into a buffer.

31. The invention of claim 28 wherein the memory is a computer readable buffer.

32. The invention of claim 28 wherein the code for analyzing includes code for performing a Raster Image Processing analysis on the single portion of the formatted document within the sample window to determine window coverage.

33. The invention of claim 32 wherein the document area is defined by a first plurality of dots in a row dimension and a second plurality of dots in a column dimension, wherein the window area is defined by a third plurality of dots in the row dimension and a fourth plurality of dots in the column dimension, the third plurality less than the first plurality, and the fourth plurality less than the second plurality, and wherein the code for ascertaining the resource requirements includes code for multiplying the window coverage by a factor related to a size of the window area to determine the page coverage of the document.

34. The invention of claim 33 wherein the code for ascertaining the resource requirements includes code for multiplying the page coverage by a number of pages in the print job to determine job requirements.

35. The program of claim 28, wherein the code for formatting includes code for formatting the document at a print resolution, and wherein the code for analyzing includes code for analyzing the portion of the formatted print document at the print resolution.

36. The method of claim 28, wherein the code for formatting includes code for formatting the document at a print resolution, and wherein the code for analyzing includes code for analyzing the single overlaid portion of the formatted print document at a different resolution lower than the print resolution.

37. A program stored on a computer readable medium for ascertaining resource requirements of a print job received by a print driver including:
 code for creating a document of the print job with the print driver and reading the print job into memory directly from the print driver;
 code for overlaying a sample window over a single portion of the document;
 code for performing a low resolution level analysis of only the single portion of the formatted document overlaied ed by the sample window to determine consumable resource requirements of the overlaied portion;
 code for extrapolating the resource requirements of the single overlaied portion to estimate consumable resource requirements of the entire print job; and
 code for comparing the estimated resource requirements of the print job to data relating to an availability of the resource and providing an output with response thereto prior to sending the print job to a printer.

38. The invention of claim 37 further including code for providing actual resource requirements of the print job.

39. The invention of claim 38 further including code for comparing the actual resource requirements to the estimated resource requirements and generating correction data in response thereto.

40. The invention of claim 39 further including code for adjusting the low resolution level analysis in response to the correction data.

* * * * *

UNITED STATES PATENT AND TRADEMARK OFFICE
CERTIFICATE OF CORRECTION

PATENT NO. : 7,106,462 B2 Page 1 of 1
APPLICATION NO. : 09/824902
DATED : September 12, 2006
INVENTOR(S) : Mark A. Harper et al.

It is certified that error appears in the above-identified patent and that said Letters Patent is hereby corrected as shown below:

In column 6, line 4, in Claim 9, after "providing" insert -- a --.

In column 6, line 37, in Claim 16, delete "overlaied" and insert -- overlaid --, therefor.

In column 6, line 39, in Claim 16, delete "overlaied" and insert -- overlaid --, therefor.

In column 6, line 41, in Claim 16, delete "overlaied" and insert -- overlaid --, therefor.

In column 7, line 26, in Claim 28, delete "lob" and insert -- job --, therefor.

In column 8, line 27, in Claim 37, delete "overlaied ed" and insert -- overlaid --, therefor.

In column 8, line 28, in Claim 37, delete "overlaied" and insert -- overlaid --, therefor.

In column 8, line 31, in Claim 37, delete "overlaied" and insert -- overlaid --, therefor.

Signed and Sealed this

Twentieth Day of January, 2009

JON W. DUDAS
*Director of the United States Patent and Trademark Office*